United States Patent
Baldwin et al.

(10) Patent No.: US 9,582,947 B2
(45) Date of Patent: Feb. 28, 2017

(54) AUTHENTICATING A USER ON BEHALF OF ANOTHER USER BASED UPON A UNIQUE BODY SIGNATURE DETERMINED THROUGH BONE CONDUCTION SIGNALS

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 361 days.

(21) Appl. No.: 14/083,499

(22) Filed: Nov. 19, 2013

(65) Prior Publication Data
US 2015/0137936 A1 May 21, 2015

(51) Int. Cl.
G07C 9/00 (2006.01)

(52) U.S. Cl.
CPC ............ *G07C 9/00071* (2013.01); *G07C 2009/00809* (2013.01)

(58) Field of Classification Search
CPC ........... G07C 9/00071; G07C 9/00309; G07C 9/00103; G07C 9/00182; B60R 25/04; B60R 25/24
See application file for complete search history.

(56) References Cited

U.S. PATENT DOCUMENTS

| | | | |
|---|---|---|---|
| 3,629,521 A | 12/1971 | Puharich et al. | |
| 4,048,986 A | 9/1977 | Ott | |
| 4,340,778 A | 7/1982 | Cowans et al. | |
| 4,421,119 A | 12/1983 | Pratt, Jr. | |

(Continued)

FOREIGN PATENT DOCUMENTS

| AU | 2003257031 | 2/2004 |
|---|---|---|
| AU | 2007200415 | 8/2007 |

(Continued)

OTHER PUBLICATIONS

Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.

(Continued)

*Primary Examiner* — Sisay Yacob
(74) *Attorney, Agent, or Firm* — Hartman & Citrin LLC

(57) ABSTRACT

Concepts and technologies are disclosed herein for spoofing bone conduction signals. According to one aspect, a device can compare a first unique body signature associated with a first user to a second unique body signature associated with a second user to determine a first unique effect of a first body of the first user on a signal and a second unique effect of a second body of the second user on the signal. The device can generate an authentication signal based upon the first unique effect and the second unique effect to include signal characteristics that, after propagating through the first body of the first user, are representative of the second unique body signature. The device can transmit the authentication signal through the first body of the first user to an authentication device that authenticates the first user on behalf of the second user.

20 Claims, 9 Drawing Sheets

(56) References Cited

U.S. PATENT DOCUMENTS

| | | |
|---|---|---|
| 4,720,607 A | 1/1988 | de Moncuit |
| 4,754,763 A | 7/1988 | Doemland |
| 4,799,498 A | 1/1989 | Collier |
| 5,024,239 A | 6/1991 | Rosenstein |
| 5,073,950 A | 12/1991 | Colbert et al. |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Donig et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto et al. |
| 6,396,930 B1 | 5/2002 | Vaudrey et al. |
| 6,409,684 B1 | 6/2002 | Wilk |
| 6,507,662 B1 | 1/2003 | Brooks |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie |
| 9,386,962 B2 | 7/2016 | Dahl |
| 2001/0013546 A1* | 8/2001 | Ross ............... G06Q 20/40145 235/382 |
| 2001/0051776 A1 | 12/2001 | Lenhardt |
| 2003/0048915 A1 | 3/2003 | Bank |
| 2003/0066882 A1* | 4/2003 | Ross ............... G06Q 20/40145 235/380 |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon |
| 2011/0280239 A1 | 11/2011 | Tung et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1 | 4/2013 | Yoakum et al. |
| 2013/0109369 A1* | 5/2013 | Forutanpour ........ A61B 5/1072 455/418 |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1* | 6/2013 | Amento ............... H04K 1/00 381/151 |
| 2013/0170471 A1 | 7/2013 | Nix |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1 | 8/2013 | Nakamura |

(56) References Cited

U.S. PATENT DOCUMENTS

| | | | |
|---|---|---|---|
| 2013/0225915 | A1 | 8/2013 | Redfield et al. |
| 2013/0225940 | A1 | 8/2013 | Fujita et al. |
| 2013/0278396 | A1 | 10/2013 | Kimmel |
| 2013/0288655 | A1 | 10/2013 | Foruntanpour et al. |
| 2013/0346620 | A1 | 12/2013 | Gizis et al. |
| 2014/0009262 | A1 | 1/2014 | Robertson et al. |
| 2014/0028604 | A1 | 1/2014 | Morinaga et al. |
| 2014/0035884 | A1 | 2/2014 | Oh |
| 2014/0097608 | A1 | 4/2014 | Buzhardt et al. |
| 2014/0099991 | A1 | 4/2014 | Cheng et al. |
| 2014/0107531 | A1 | 4/2014 | Baldwin |
| 2014/0156854 | A1 | 6/2014 | Gaetano, Jr. |
| 2014/0168093 | A1 | 6/2014 | Lawrence |
| 2014/0168135 | A1 | 6/2014 | Saukko et al. |
| 2014/0174174 | A1 | 6/2014 | Uehara et al. |
| 2014/0188561 | A1 | 7/2014 | Tenbrock et al. |
| 2014/0210791 | A1 | 7/2014 | Hanauer et al. |
| 2014/0240124 | A1 | 8/2014 | Bychkov |
| 2015/0084011 | A1 | 3/2015 | Park |
| 2015/0092962 | A1 | 4/2015 | Amento et al. |
| 2015/0120465 | A1 | 4/2015 | Baldwin et al. |
| 2015/0128094 | A1 | 5/2015 | Baldwin et al. |
| 2015/0137960 | A1 | 5/2015 | Baldwin et al. |
| 2015/0138062 | A1 | 5/2015 | Baldwin et al. |
| 2015/0150116 | A1 | 5/2015 | Baldwin et al. |
| 2015/0199950 | A1 | 7/2015 | Heiman |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 5/2010 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 25, 2015 in U.S. Appl. No. 11/586,142.
U.S. Office Action dated Aug. 25, 2015 in U.S. Appl. No. 14/083,094.
U.S. Office Action dated Jun. 25, 2015 in U.S. Appl. No. 14/083,110.
U.S. Appl. No. 14/482,087, filed Sep. 10, 2014.
U.S. Appl. No. 14/482,091, filed Sep. 10, 2014.
U.S. Appl. No. 14/482,101, filed Sep. 10, 2014.
U.S. Appl. No. 14/482,078, filed Sep. 10, 2014.
U.S. Appl. No. 14/482,658, filed Oct. 15, 2014.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intrabody communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body." IMCIC 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
Zhong et al., "OsteoConduct: Wireless Body-Area Communication based on Bone Conduction," Proceeding of the ICST 2nd International Conference on Body Area Networks, BodyNets 2007.
Travis Deyle et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Lopez, et al., "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Kompis, Martin, and Rudolf Haeusler, "Electromagnetic interference of bone-anchored hearing aids by cellular phones revisited," Acta oto-laryngologica 122.5, 2002, 510-512.
Amento et al., "The Sound of One Hand: A Wrist-Mounted Bio-Acoustic Fingertip Gesture Interface," Short Talk: It's All About Sound, Apr. 20, 2002, 724-725, ACM, Minneapolis, Minnesota, USA.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Chris Harrison, Desney Tan, Dan Morris, "Skinput: Appropriating the Skin as an Interactive Canvas," CommuniCations of the ACM 54.8, 2011, 111-118.

(56) References Cited

OTHER PUBLICATIONS

T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel."
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air- and Bone-Conductive Microphones," Multimedia Signal Processing, 2004 IEEE 6th Workshop, IEEE, 2004.
U.S. Office Action dated Feb. 13, 2013 in U.S. Appl. No. 13/309,124.
U.S. Office Action dated Sep. 24, 2013 in U.S. Appl. No. 13/309,124.
Non-final Office Action mailed on Jan. 29, 2014 in U.S. Appl. No. 13/309,124.
U.S. Office Action dated Dec. 17, 2015 in U.S. Appl. No. 14/065,663.
U.S. Office Action dated Nov. 19, 2015 in U.S. Appl. No. 14/090,668.
U.S. Office Action dated Jan. 11, 2016 in U.S. Appl. No. 14/514,658.
U.S. Office Action dated Feb. 25, 2016 in U.S. Appl. No. 14/072,126.
U.S. Notice of Allowance dated Mar. 21, 2016 in U.S. Appl. No. 14/090,668.
U.S. Office Action dated Mar. 16, 2016 in U.S. Appl. No. 14/482,087.
U.S. Office Action dated Mar. 10, 2016 in U.S. Appl. No. 14/482,091.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Office Action dated Oct. 20, 2016 in U.S. Appl. No. 14/482,078.
U.S. Office Action dated Dec. 14, 2016 in U.S. Appl. No. 14/561,549.
U.S. Notice of Allowance dated Oct. 7, 2016 in U.S. Appl. No. 15/224,808.

* cited by examiner

AUTHENTICATING A USER ON BEHALF OF ANOTHER USER BASED UPON A UNIQUE BODY SIGNATURE DETERMINED THROUGH BONE CONDUCTION SIGNALS

BACKGROUND

Bone conduction is a developing communication technology. One application of bone conduction technologies is authentication. The unique composition of an individual results in unique changes to a signal as the signal passes through the individual.

SUMMARY

Concepts and technologies are disclosed herein for spoofing bone conduction signals. According to one aspect, a device can compare a first unique body signature associated with a first user to a second unique body signature associated with a second user to determine a first unique effect of a first body of the first user on a signal and a second unique effect of a second body of the second user on the signal. The device can generate an authentication signal based upon the first unique effect and the second unique effect to include signal characteristics that, after propagating through the first body of the first user, are representative of the second unique body signature. The device can transmit the authentication signal through the first body of the first user to an authentication device. The authentication device can authenticate the first user on behalf of the second user based upon the second unique body signature.

In some embodiments, the device can obtain the first unique body signature and/or the second unique body signature from a server. In some other embodiments, the device can generate the first unique body signature and/or the second unique body signature.

In some embodiments, the authentication device is or includes a device to which the first user desires access. In some other embodiments, the authentication device authenticates the first user to access an area. In some other embodiments, the authentication device authenticates the first user to access a further device.

In some embodiments, the device receives a signal from a user device associated with the first user and modifies the signal to generate the authentication signal. In these embodiments, the device can be positioned between the user device and the first body.

In some embodiments, the device receives a signal from the first body of the first user and modifies the signal to remove the first unique effect and to add the second unique effect, thereby generating the authentication signal. In these embodiments, the device can be positioned between the first body and the authentication device.

It should be appreciated that the above-described subject matter may be implemented as a computer-controlled apparatus, a computer process/method, a computing system, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
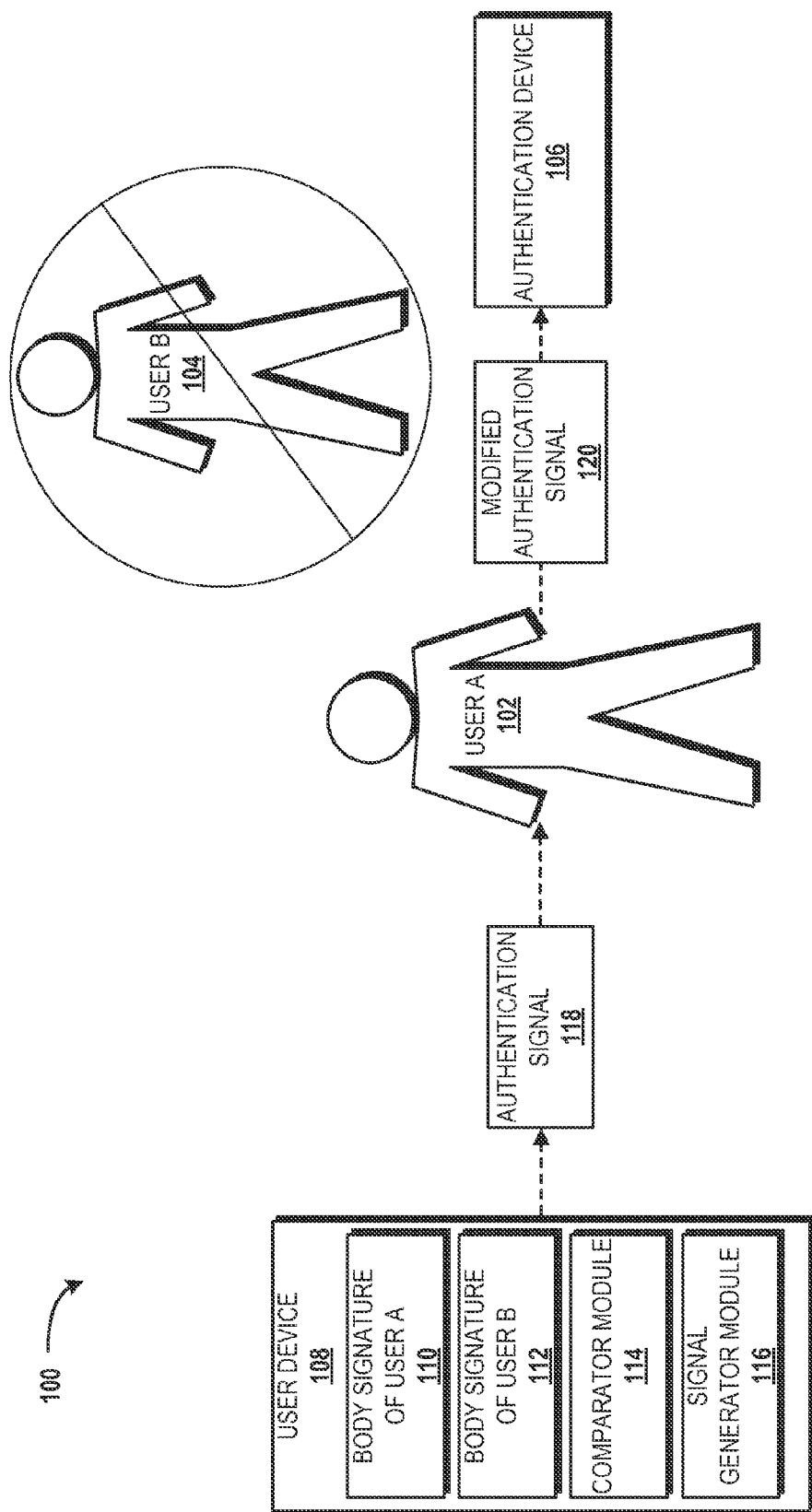
FIG. 1 is a block diagram illustrating aspects of an illustrative operating environment for various concepts disclosed herein, according to an illustrative embodiment.

Concepts and technologies disclosed herein are directed to spoofing bone conduction signals. According to one aspect disclosed herein, a hardware and/or software component is used to change a bone conduction signal that has propagated through a first individual to appear as if the bone conduction signal actually traversed a second individual. For example, an emergency scenario may exist in which an individual is incapacitated outside his/her house and emergency personnel needs to enter the house which uses bone conduction to unlock the door. Other authentication mechanisms, such as finger print scanners, would allow the emergency personnel to move the incapacitated individual to the door and hold his/her finger against the finger print scanner to unlock the door. A similar solution is not easily replicated with bone conduction because the emergency personnel would be in contact with the incapacitated individual, and as a result, would inadvertently alter the bone conduction signal causing the authentication to fail. However, if an input signal and output signal are captured for the incapacitated individual, emergency personnel could employ the spoofing mechanism disclosed herein to spoof a bone conduction signal as having traversed the incapacitated individual.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of disrupting bone conduction signals will be presented.

Referring now to FIG. 1, aspects of an operating environment 100 in which various embodiments presented herein may be implemented will be described, according to an illustrative embodiment. The operating environment 100 shown in FIG. 1 includes a first user ("user A 102"), a second user ("user B 104"), an authentication device 106, and a user device 108. The user B 104 can be authenticated by the authentication device 106 to access the authentication device 106, another device (not shown), or an area (also not shown) using a bone conduction-based authentication mechanism. The bone conduction-based authentication mechanism can utilize a signal that is tuned to propagate through the body, and more particularly one or more bones, of the user B 104 to the authentication device 106. The authentication device 106 can receive the signal as modified by the body of user B 104 and can determine whether or not the user B 104 is to be authenticated based upon the modified signal. In particular, the body composition of the user B 104 can modify the signal such that the modified signal exhibits one or more unique effects as a result of propagating through the body of the user B 104. These unique effects, which are collectively referred to herein as a unique body signature, can provide an authentication mechanism that is not easily replicated by other individuals, such as the user A 102.

Situations may arise in which the user A 102 may need to authenticate to the authentication device 106 using bone conduction on behalf of the user B 104 because, as in the example shown in FIG. 1, the user B 104 is incapacitated or is otherwise unavailable. For example, an emergency scenario may exist in which the user A 102 is an emergency medical technician ("EMT") or other emergency personnel attempting to access a home of the user B 104 to which the authentication device 106 provides authenticated access. In this scenario, the user B 104 may be unavailable such as out of town or at work, or the user B 104 may be incapacitated and unable to come into contact with the authentication device 106 without the assistance of the user A 102. If the user A 102 comes into contact with the user B 104 during authentication with the authentication device 106, the unique effect(s) of the body of the user B 104 and the unique effect(s) of the body of the user A 102 will modify a bone conduction signal so that the modified bone conduction signal is not representative of only the unique body signature of the user B 104, and as a result, the authentication device 106 will fail to authenticate the user B 104. To allow the user A 102 to be authenticated by the authentication device 106 on behalf of the user B 104, the user device 108 can modify a signal to be representative of a signal propagating through the body of the user B 104, as will be described in greater detail below.

The authentication device 106, in some embodiments, is or includes a desktop, laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a personal digital assistant ("PDA"); a keyboard, a keypad, a track pad, a touch pad, a mouse, a trackball, a joystick, a video game controller, a motion control device, a remote control, or other input device; headphones, speakers, or other audio output device; a hands-free communication system; a hearing aid; a door entry mechanism (e.g., a door knob); a key fob; an article of clothing such as a wallet, a purse, a bag, a backpack, an earring, a necklace, a watch, a bracelet, an anklet, a ring, a belt, or a holster; combinations thereof, or the like. In some embodiments, the authentication device 106 authenticates one or more users to access one or more of the aforementioned devices. In some embodiments, the authentication device 106 is utilized to provide authenticated access to a restricted area such as a building, room, outdoor area, or the like. It should be understood that the functionality of the authentication device 106 can be provided by a single device, by two or more similar devices, and/or by two or more dissimilar devices The user device 108, in some embodiments, is or includes a desktop, laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a PDA; combinations thereof, or the like. It should be understood that the functionality of the user device 108 can be provided by a single device, by two or more similar devices, and/or by two or more dissimilar devices.

The illustrated user device 108 includes a unique body signature of the user A 102 ("body signature of user A 110") and a unique body signature of the user B 104 ("body signature of user B 112"). The body signature of user A 110 and/or the body signature of user B 112 can be stored locally in one or more memory components (not shown) of the user device 108. Alternatively, the body signature of user A 110 and/or the body signature of user B 112 can be accessed from a server or other device that is operating remotely from the user device 108.

The body signature of user A 110 and the body signature of user B 112 can include one or more unique effects of the body of user A 102 and the body of user B 104, respectively, on a reference bone conduction signal (not shown). The unique effect(s) may modify the amplitude, frequency, and/or phase characteristics of the reference bone conduction signal. The unique effect(s) of the bodies of the users 102, 104 on the reference bone conduction signal (and other bone conduction signals) is/are due, at least in part, to the individual height, weight, body fat percentage, body muscle percentage, and/or bone characteristics, such as bone density and bone mass, of the users 102, 104. Other factors, such as those related to an environment in which the users 102, 104 are located, may or may not alter the amplitude, frequency, and/or phase characteristics for the vibrations caused by a given bone conduction signal propagated successfully through the bodies of the users 102, 104.

In some embodiments, the user device 108 can generate the reference bone conduction signal, send the reference bone conduction signal to the body of user A 102 and/or the body of user B 104, receive a modified version of the reference bone conduction signal from the body of user A 102 and/or the body of user B 104, and generate the body signature of user A 110 and/or the body signature of user B 112 based upon a comparison of the reference bone conduction signal to the modified version of the reference bone conduction signal. In some other embodiments, the user device 108 receives the body signature of user A 110 and/or the body signature of user B 112 from an external source, such as another device or a server. In these embodiments, the body signature of user B 112 can be generated by a device associated with the user B 104 and sent to the user device 108 directly or via a server, for example.

The illustrated user device 108 also includes a comparator module 114 and a signal generator module 116. The comparator module 114 and/or the signal generator module 116, in some embodiments, is/are included in an operating system of the user device 108 and is/are accessible by one or more applications to cause the comparator module 114 and/or the signal generator module 116 to perform one or more operations. In some other embodiments, the comparator module 114 and a signal generator module 116 are stand-alone applications or included in one or more other applications.

The comparator module 114 and the signal generator module 116 can be executed by one or more processors of the user device 108 (not illustrated in FIG. 1, but illustrated and described below with reference to FIG. 6). In particular, the comparator module 114 can compare the body signature of user A 110 to the body signature of user B 112 to determine the unique effect(s) of the body of user A 102 and the body of user B 104 on a bone conduction signal and to determine the differences in the unique effect(s). The comparator module 114 can provide results of this comparison to the signal generator module 116.

The signal generator module 116 can generate an authentication signal 118 based upon the results received from the comparator module 114 and transmit the authentication signal 118 to the body of user A 102. The authentication signal 118 can propagate through the body of user A 102 to the authentication device 106. The body of user A 102 modifies the authentication signal 118 to form a modified authentication signal 120. In particular, the signal generator module 116 can generate the authentication signal 118 to have amplitude, frequency, and/or phase characteristics such that after propagating through the body of user A 102, the authentication signal 118 as modified by the body of user A 102 (i.e., the modified authentication signal 120) is the same signal as would be output from the body of user B 104 when attempting to authenticate to the authentication device 106. For example, the authentication signal 118 can be generated to include signal characteristics that are representative of the body signature of user B 112 and signal characteristics designed to cancel out other signal characteristics that are representative of the body signature of user A 110 so that when the authentication signal 118 propagates through the body of user A 102, the body signature of user A 110 is canceled out leaving the body signature of user B 112 as output from the body of user A 102 to the authentication device 106.

In some embodiments, the signal generator module 116 generates the authentication signal 118 to carry information, such as an authentication key, to the authentication device 106. The authentication key may provide a second factor of authentication where the first factor is the unique body signature of user B 104 as spoofed by the modified authentication signal 120. The authentication key may be a password, personal identification number, or any other authentication mechanism that can be carried by a signal from the user device 108 to the authentication device 106 through the body of user A 102.

FIG. 1 illustrates one authentication device 106, one user device 108, one comparator module 114, one signal generator module 116, one authentication signal 118, and one modified authentication signal 120. It should be understood, however, that various implementations of the operating environment 100 includes multiple authentication devices 106, multiple user devices 108, multiple comparator modules 114, multiple signal generator modules 116, multiple authentication signals 118, and/or multiple modified authentication signals 120. Moreover, although only two users and respective body signatures are illustrated, more than two users and body signatures may be involved in a particular implementation of the operating environment 100. As such, the illustrated embodiment should be understood as being illustrative, and should not be construed as being limiting in any way.

Figure 2:
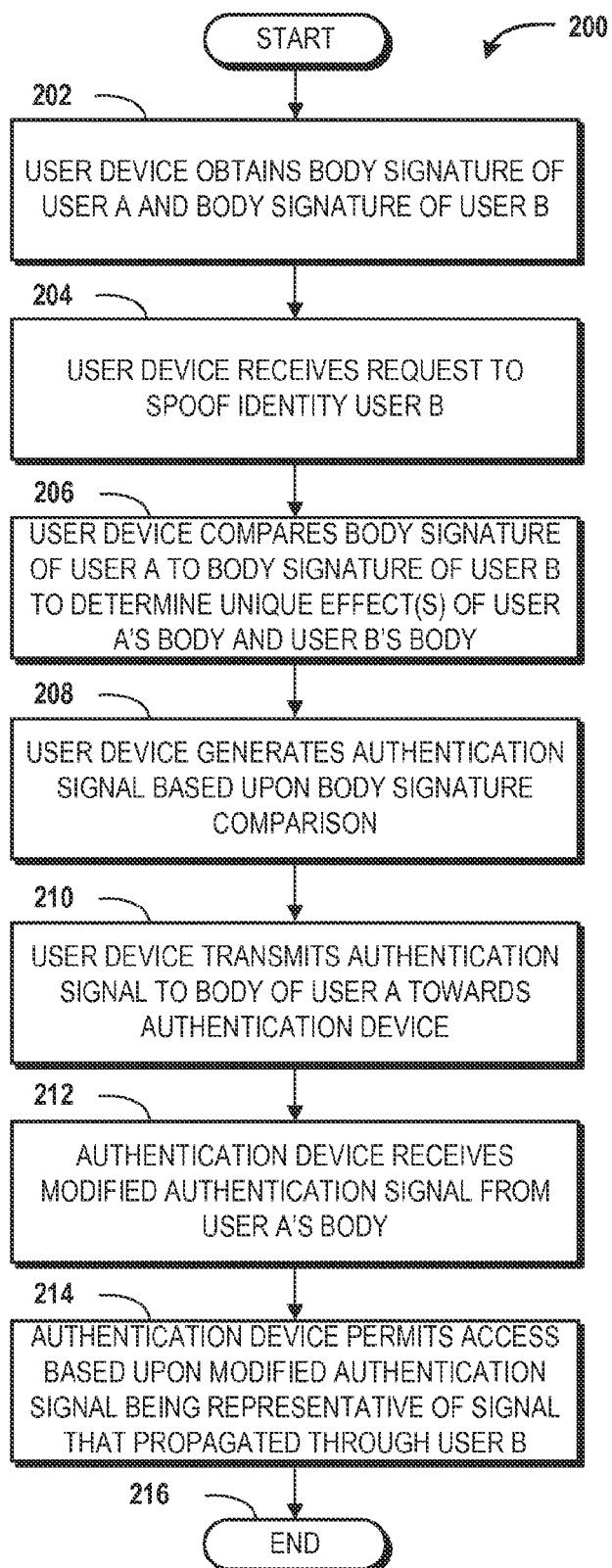
FIG. 2 is a flow diagram illustrating aspects of a method for spoofing a bone conduction signal, according to an illustrative embodiment.

Turning now to FIG. 2, aspects of a method 200 for spoofing a bone conduction signal will be described in detail, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the authentication device 106, the user device 108, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the authentication device 106, the user device 108, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 108 and the authentication device 106, where indicated, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user device 108 obtains the body signature of user A 110 and the body signature of user B 112. The body signature of user A 110 and the body signature of user B 112 can include one or more unique effects of the body of user A 102 and the body of user B 104, respectively, on a reference bone conduction signal. The unique effect(s) may modify the amplitude, frequency, and/or phase characteristics of the reference bone conduction signal.

In some embodiments, the user device 108, at operation 202, generates a reference bone conduction signal, sends the reference bone conduction signal to the body of user A 102 and/or the body of user B 104, receives a modified version of the reference bone conduction signal from the body of user A 102 and/or the body of user B 104, and generates the body signature of user A 110 and/or the body signature of user B 112 based upon a comparison of the reference bone conduction signal to the modified version of the reference bone conduction signal. In some other embodiments, the user device 108 receives the body signature of user A 110 and/or the body signature of user B 112 from an external source, such as another device or a server. In these embodiments, the body signature of user B 112 can be generated by a device associated with the user B 104 and sent to the user device 108 directly, or via a server, for example.

From operation 202, the method 200 proceeds to operation 204, where the user device 108 receives a request to spoof the identity of user B 104 to allow the user A 102 to be authenticated by the authentication device 106. In some embodiments, the user device 108 receives the request via a user interface of the user device 108. The user interface may be, for example, part of an operating system or an application executing on the user device 108. The request may be generated in response to an input provided by the user A 102 via one or more input components of the user device 108, such as, for example, a keyboard, a keypad, a single or multi-touch touchscreen, a touch pad, a trackball, a joystick, a microphone, or other input component such as described herein below with reference to FIG. 6.

From operation 204, the method 200 proceeds to operation 206, where, responsive to the request received at operation 204, the user device 108 executes the comparator module 114 to compare the body signature of user A 110 to the body signature of user B 112 to determine one or more differences between how the bodies of the users 102, 104 affect the reference bone conduction signal for use in generating the authentication signal 118. From operation 206, the method 200 proceeds to operation 208, where the user device 108 executes the generator module 116 to generate the authentication signal 118 based upon the body signature comparison performed at operation 206. In particular, the generator module 116 generates the authentication signal 118 to have amplitude, frequency, and/or phase characteristics such that after propagating through the body of user A 102, the authentication signal 118 as modified by the body of user A 102 (i.e., the modified authentication signal 120) is the same signal as would be output from the body of user B 104 when attempting to authenticate to the authentication device 106. For example, the authentication signal 118 can be generated to include signal characteristics that are representative of the body signature of user B 112 and signal characteristics designed to cancel out other signal characteristics that are representative of the body signature of user A 110 so that when the authentication signal 118 propagates through the body of user A 102, the body signature of user A 110 is canceled out leaving the body signature of user B 112 as output from the body of user A 102 to the authentication device 106.

From operation 208, the method 200 proceeds to operation 210, where the user device 108 transmits the authentication signal 118 to the body of user A 102 towards the authentication device 106. The authentication signal 118 propagates through the body of the user A 102. The body of the user A 102 modifies the authentication signal 118 to form the modified authentication signal 120. The authentication device 106, at operation 212, receives the modified authentication signal 120 from the body of user A 102. From operation 212, the method 200 proceeds to operation 214, where the authentication device 106 permits access based upon the modified authentication signal 120 being representative of a signal that has propagated through the user B 104.

From operation 214, the method 200 proceeds to operation 216. The method 200 ends at operation 216.

Figure 3A:
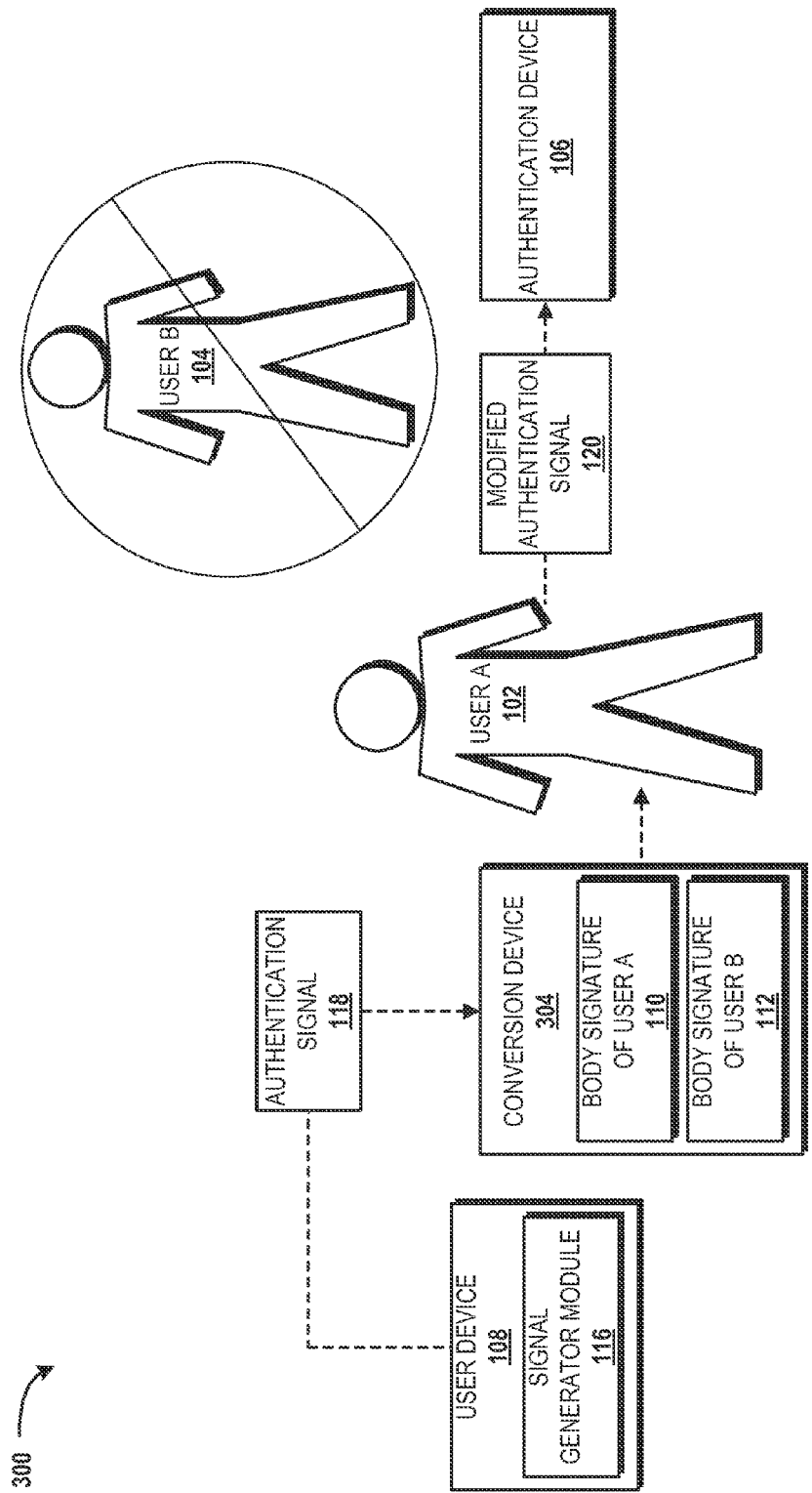
FIGS. 3A-3B are block diagrams illustrating aspects of an illustrative operating environment for various concepts disclosed herein, according to illustrative embodiments.
Figure 3B:
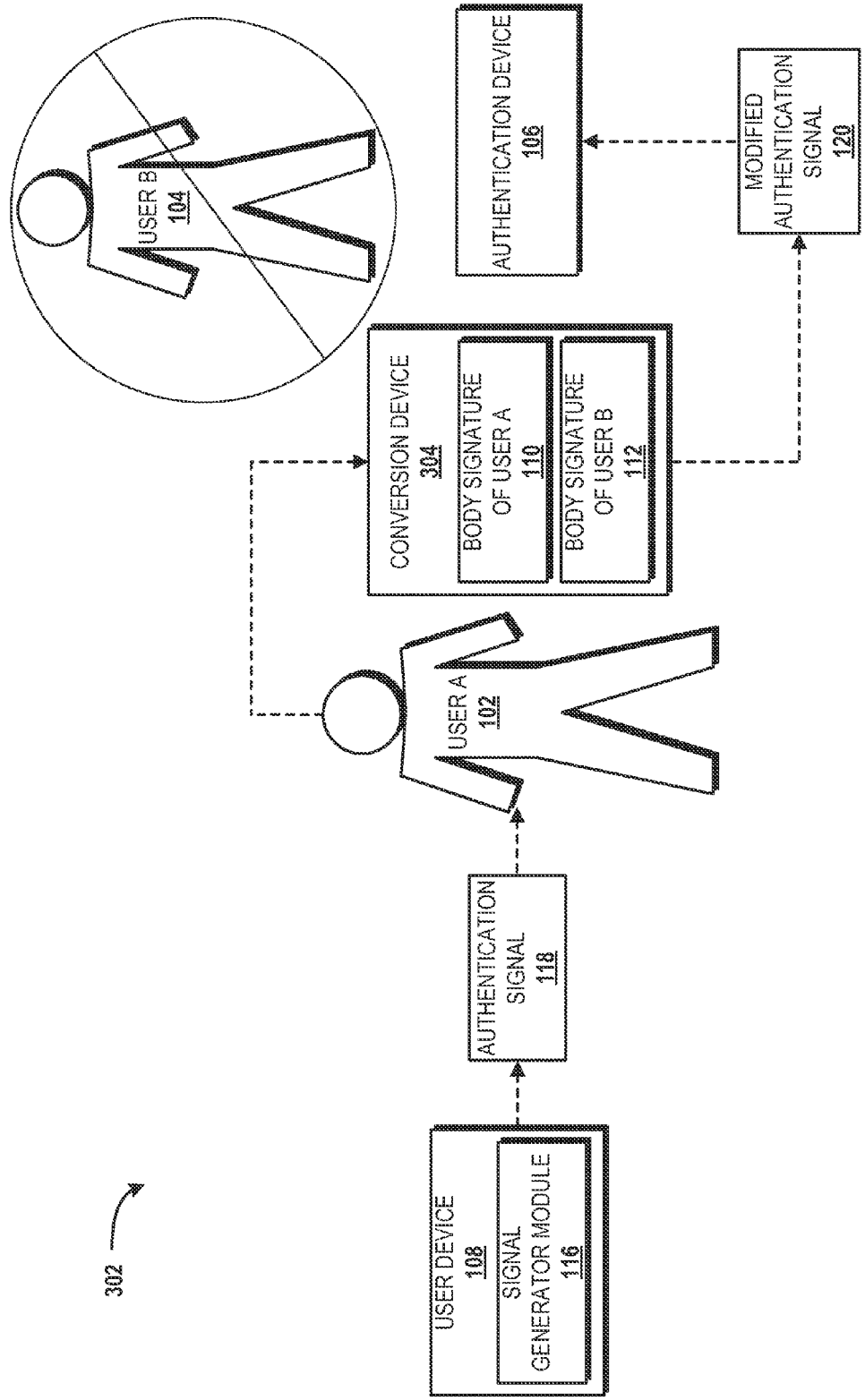

Turning now to FIGS. 3A and 3B, block diagrams illustrating aspects of other operating environments 300, 302 will be described, according to an illustrative embodiment. The operating environments 300, 302 shown in FIGS. 3A and 3B include the user A 102, the user B 104, the authentication device 106, the user device 108, the signal generator module 116, the authentication signal 118, and the modified authentication signal 120. The operating environments 300, 302 additionally include a conversion device 304.

The conversion device 304, in some embodiments, is or includes a desktop, laptop computer, a notebook computer, a tablet computer, or a netbook computer; a mobile telephone, a smartphone, or a feature phone; a video game system; a set-top box; a vehicle computing system; a smart watch; a personal tracker; a safety device; a music playback device; a video playback device; an internet appliance; a television, a monitor, a projector, or other display device; a PDA; combinations thereof, or the like. It should be understood that the functionality of the conversion device 304 can be provided by a single device, by two or more similar devices, and/or by two or more dissimilar devices.

The conversion device 304, in the illustrated embodiments, includes the body signature of user A 110 and the body signature of user B 112. The body signature of user A 110 and the body signature of user B 112 can include one or more unique effects of the body of user A 102 and the body of user B 104, respectively, on a reference bone conduction signal (not shown). The unique effect(s) may modify the amplitude, frequency, and/or phase characteristics of the reference bone conduction signal. The unique effect(s) of the bodies of the users 102, 104 on the reference bone conduction signal (and other bone conduction signals) is/are due, at least in part, to the individual height, weight, body fat percentage, body muscle percentage, and/or bone characteristics, such as bone density and bone mass, of the users 102, 104. Other factors, such as those related to an environment in which the users 102, 104 are located, may or may not alter the amplitude, frequency, and/or phase characteristics for the vibrations caused by a given bone conduction signal propagated successfully through the bodies of the users 102, 104.

In some embodiments, the conversion device 304 can generate the reference bone conduction signal, send the reference bone conduction signal to the body of user A 102 and/or the body of user B 104, receive a modified version of the reference bone conduction signal from the body of user A 102 and/or the body of user B 104, and generate the body signature of user A 110 and/or the body signature of user B 112 based upon a comparison of the reference bone conduction signal to the modified version of the reference bone conduction signal. In some other embodiments, the conversion device 304 receives the body signature of user A 110 and/or the body signature of user B 112 from an external source, such as another device or a server. In these embodiments, the body signature of user B 112 can be generated by a device associated with the user B 104 and sent to the conversion device 304 directly or via a server, for example.

The operating environment 300 shown in FIG. 3A illustrates the conversion device 304 positioned between the user device 108 and the user A 102. The conversion device 304 can receive the authentication signal 118 from the user device 108 and can compare the body signature of user A 110 to the body signature of user B 112 to determine one or more differences between how the bodies of the users 102, 104 affect the reference bone conduction signal for use in modifying the authentication signal 118 so that the modified authentication signal 120 formed after the authentication signal 118 propagates through the body of the user A 102 is representative of the same signal as would be output from the body of user B 104 when attempting to authenticate to the authentication device 106. The conversion device 304 can then modify the authentication signal 118 and send the authentication signal 118 to the body of user A 102, which outputs the modified authentication signal 120 to the authentication device 106.

The operating environment 302 shown in FIG. 3B illustrates the conversion device 304 positioned between the user A 102 and the authentication device 106. The conversion device 304 can receive the authentication signal 118 from the body of user A 102 and can compare the body signature of user A 110 to the body signature of user B 112 to determine one or more differences between the bodies of the users 102, 104 affect the reference bone conduction signal for use in modifying the authentication signal 118 to generate the modified authentication signal 120 to be representative of the same signal as would be output from the body of user B 104 when attempting to authenticate to the authentication device 106. The conversion device 304 can then modify the authentication signal 118 to generate the modified authentication signal 120 and send the modified authentication signal 120 to the authentication device 106.

FIGS. 3A and 3B illustrate one authentication device 106, one user device 108, one comparator module 114, one signal generator module 116, one authentication signal 118, and one modified authentication signal 120. It should be understood, however, that various implementations of the operating environment 100 includes multiple authentication devices 106, multiple user devices 108, multiple comparator modules 114, multiple signal generator modules 116, multiple authentication signals 118, and/or multiple modified authentication signals 120. Moreover, although only two users and respective body signatures are illustrated, more than two users and body signatures may be involved in a particular implementation of the operating environment 100. As such, the illustrated embodiment should be understood as being illustrative, and should not be construed as being limiting in any way.

Figure 4:
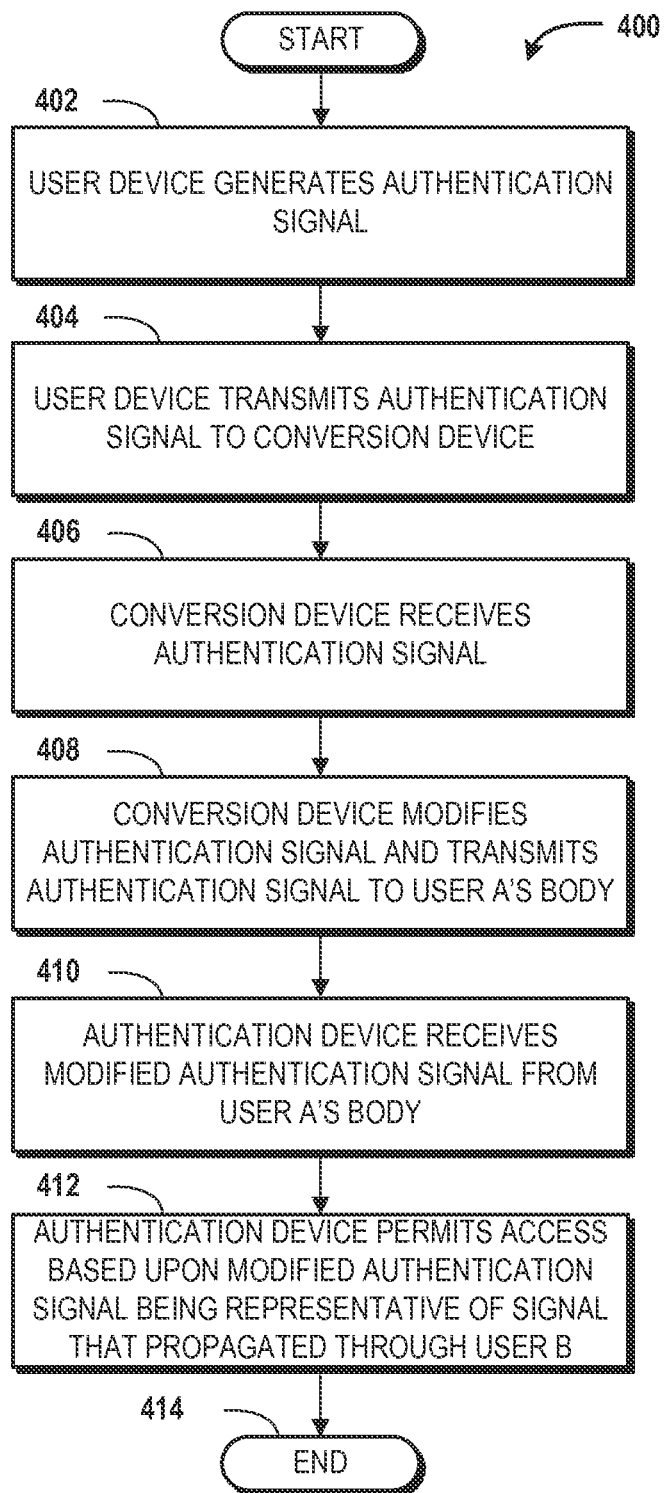
FIG. 4 is a flow diagram illustrating aspects of another method for spoofing a bone conduction signal, according to another illustrative embodiment.

Turning now to FIG. 4, aspects of a method 400 for spoofing a bone conduction signal will be described in detail, according to an illustrative embodiment. The method 400 will be described with reference to FIG. 4 and further reference to FIG. 3A. The method 400 begins at operation 402, where the user device 108 generates the authentication signal 118. From operation 402, the method 400 proceeds to operation 404, where the user device 108 transmits the authentication signal 118 to the conversion device 304. From operation 404, the method 400 proceeds to operation 406, where the conversion device 304 receives the authentication signal 118.

From operation 406, the method 400 proceeds to operation 408, where the conversion device 304 modifies the authentication signal 118. The conversion device 304 modifies one or more characteristics of the authentication signal 118 to account for differences between how the body of user A 102 and the body of user B 104 affect the reference bone conduction signal so that the authentication signal 118, after propagating through the user A 102, appears to the authentication device 106 as the modified authentication signal 120. The modified authentication signal 120 is representative of a bone conduction signal that has propagated through only the body of user B 104. In the illustrated embodiment, the conversion device 304 stores, in one or more memory components (not shown), the body signature of user A 110 and the body signature of user B 112. The conversion device 304 can utilize the body signature of user A 110 and the body signature of user B 112 to ascertain differences between the effect(s) that the body of user A 102 and the body of user B 104 has on the authentication signal 118 to modify the authentication signal 118 to be representative of a bone conduction signal that has propagated through only the body of the user B 104 after the bone conduction signal has propagated through the user A 102.

From operation 408, the method 400 proceeds to operation 410, where the authentication device 106 receives the modified authentication signal 120 from the body of user A 102. From operation 410, the method 400 proceeds to operation 412, where the authentication device 106 permits access based upon the modified authentication signal 120.

From operation 412, the method 400 proceeds to operation 414. The method 400 ends at operation 414.

Figure 5:
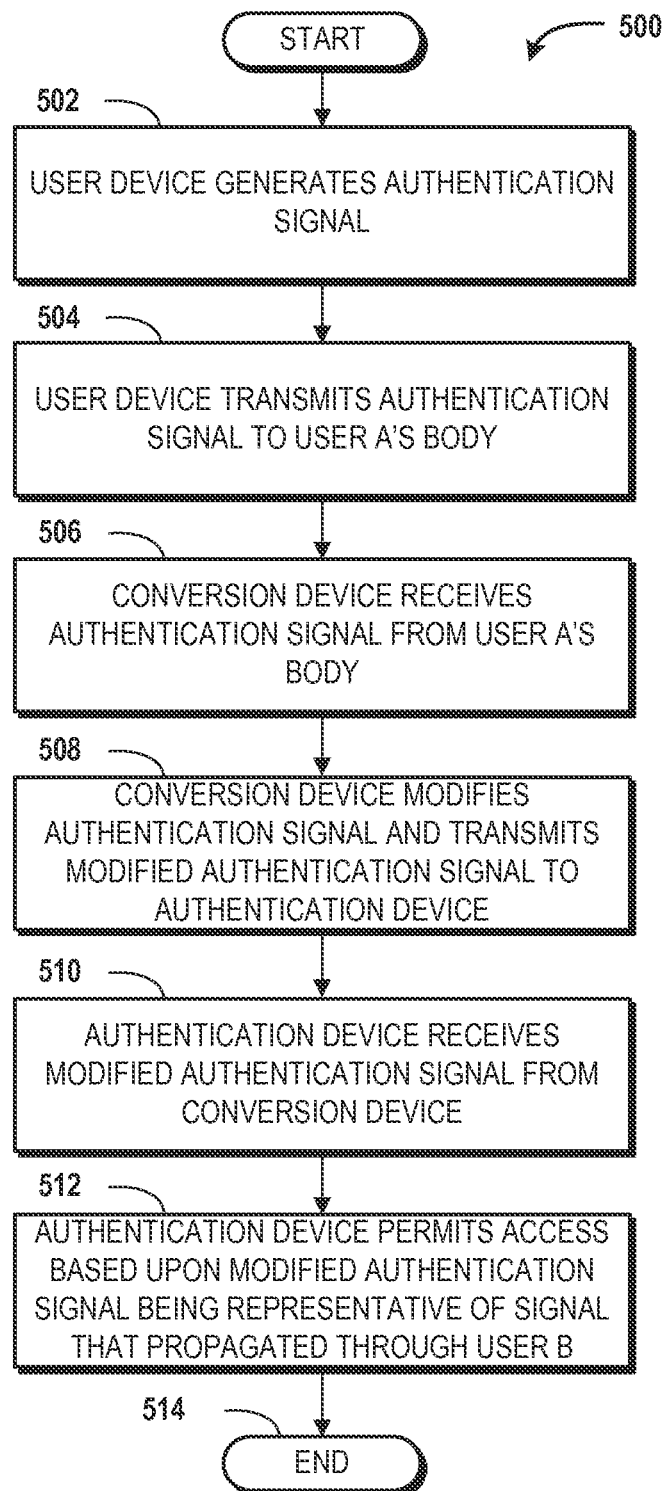
FIG. 5 is a flow diagram illustrating aspects of another method for spoofing a bone conduction signal, according to another illustrative embodiment.

Turning now to FIG. 5, aspects of a method 500 for spoofing a bone conduction signal will be described in detail, according to an illustrative embodiment. The method 500 will be described with reference to FIG. 5 and further reference to FIG. 3B. The method 500 begins at operation 502, where the user device 108 generates the authentication signal 118. From operation 502, the method 500 proceeds to operation 504, where the user device 108 transmits the authentication signal 118 to the body of user A 102. The authentication signal 118 propagates through the body of user A 102 to the conversion device 304.

From operation 504, the method 500 proceeds to operation 506, where the conversion device 304 receives the authentication signal 118 from the body of user A 102. From operation 506, the method 500 proceeds to operation 508, where the conversion device 304 modifies the authentication signal 118 and transmits the modified authentication signal 120 to the authentication device 106. In the illustrated embodiment, the conversion device 304 stores, in one or more memory components (not shown), the body signature of user A 110 and the body signature of user B 112. The conversion device 304 can utilize the body signature of user A 110 and the body signature of user B 112 to ascertain differences between the effect(s) that the body of user A 102 and the body of user B 104 has on the authentication signal 118 to modify the authentication signal 118 to be representative of a bone conduction signal that has propagated through only the body of the user B 104 after the bone conduction signal has propagated through the user A 102.

From operation 508, the method 500 proceeds to operation 510, where the authentication device 106 receives the modified authentication signal 120 from the conversion device 304. From operation 510, the method 500 proceeds to operation 512, where the authentication device 106 permits access based upon the modified authentication signal 120.

From operation 512, the method 500 proceeds to operation 514. The method 500 ends at operation 514.

Figure 6:
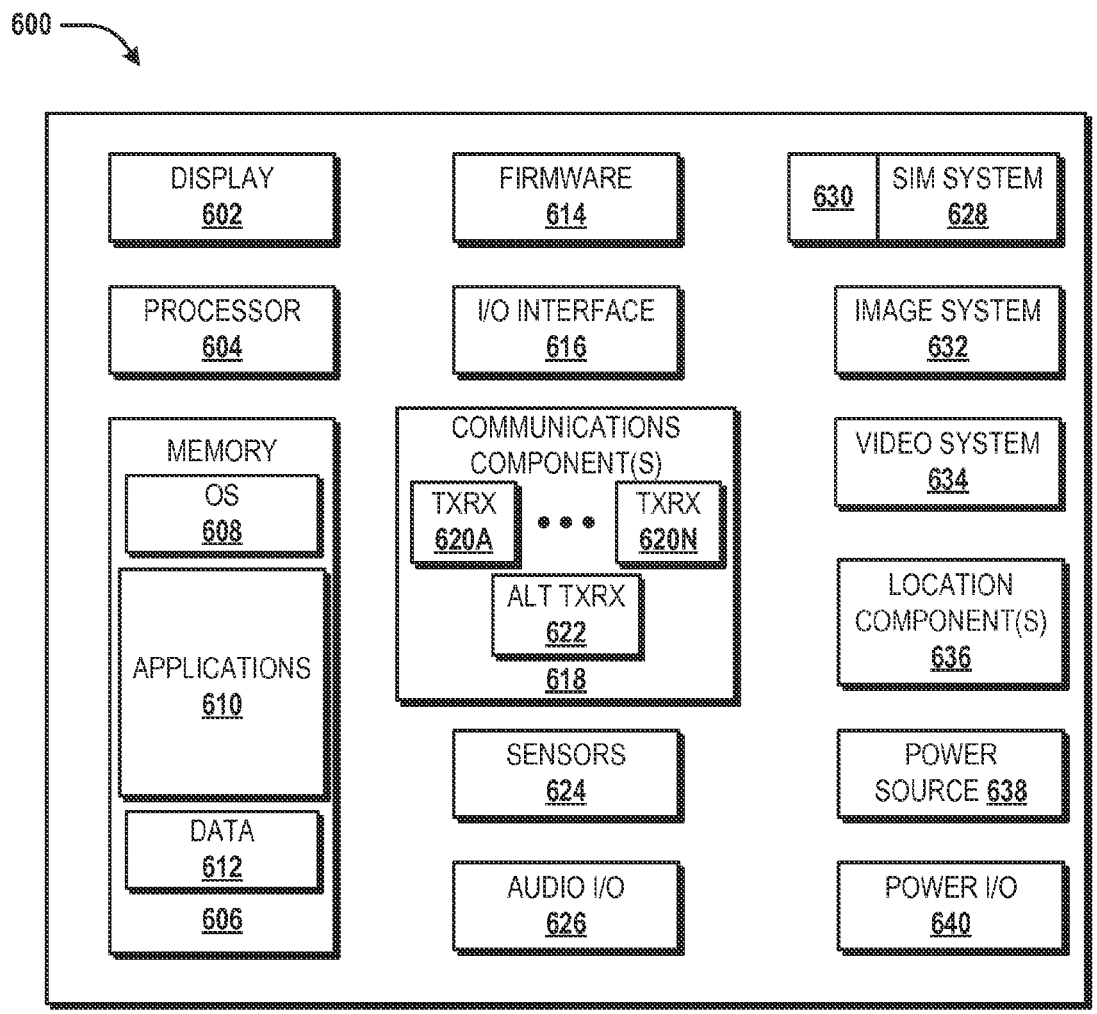
FIG. 6 is a block diagram illustrating an example mobile device capable of implementing aspects of the embodiments disclosed herein.

Turning now to FIG. 6, an illustrative mobile device 600 and components thereof will be described. In some embodiments, the authentication device 106, the user device 108, and/or the conversion device 304, each of which is described above, can be configured as and/or can have an architecture similar or identical to the mobile device 600 described herein in FIG. 6. It should be understood, however, that the authentication device 106, the user device 108, and/or the conversion device 304 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include user preferences, user settings, and/or other data. The applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, the body signature of user A 110, the body signature of user B 112, the comparator module 114, the signal generator module 116, and/or portions thereof can be stored in the memory 606 and/or in a firmware 614, and can be executed or otherwise utilized by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1364 ("FIREWIRE") port, a serial port, a parallel port, an Ethernet (RJ411) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the networks 714 and 800 described below with reference to FIG. 7 and FIG. 8. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using Global System for Mobile communication ("GSM"), Code Division Multiple Access ("CDMA"), CDMAONE, CDMA2000, Long-Term Evolution ("LTE"), and various other 2G, 2.5, 3G, 4G, and greater generation technology standards. Moreover, the communications component 618 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 618 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, IRDA, NFC, other RF technologies, combinations thereof, and the like. In some embodiments, the user device 108 and the conversion device 304 can communicate via one or more of the aforementioned communications technologies.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
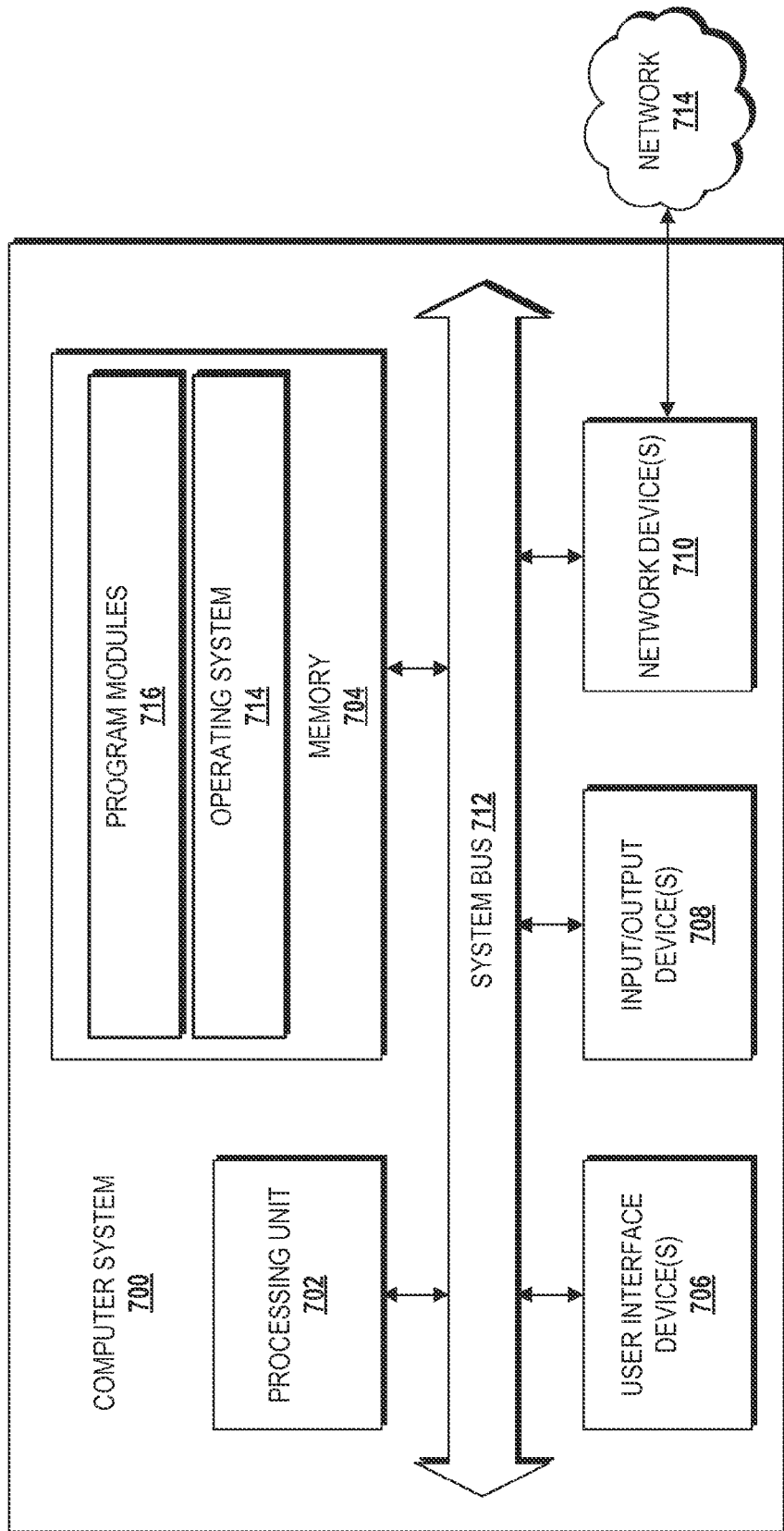
FIG. 7 is a block diagram illustrating an example computer system capable of implementing aspects of the embodiments presented herein.

FIG. 7 is a block diagram illustrating a computer system 700 configured to provide the functionality in accordance with various embodiments of the concepts and technologies disclosed herein. In some embodiments, the authentication device 106, the user device 108, and/or the conversion device 304, each of which is described above, are configured to utilize an architecture that is the same as or similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform one or more of the operations described herein. According to embodiments, the program modules 716 may be embodied in hardware, software, firmware, or any combination thereof. Although not shown in FIG. 7, it should be understood that the memory 704 also can be configured to store the body signature of user A 110, the body signature of user B 112, the comparator module 114, the signal generator module 116, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 714. Examples of the network devices 710 include, but are not limited to, a modem, a radio frequency ("RF") or infrared ("IR") transceiver, a telephonic interface, a bridge, a router, or a network card. The network 714 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 714 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 8:
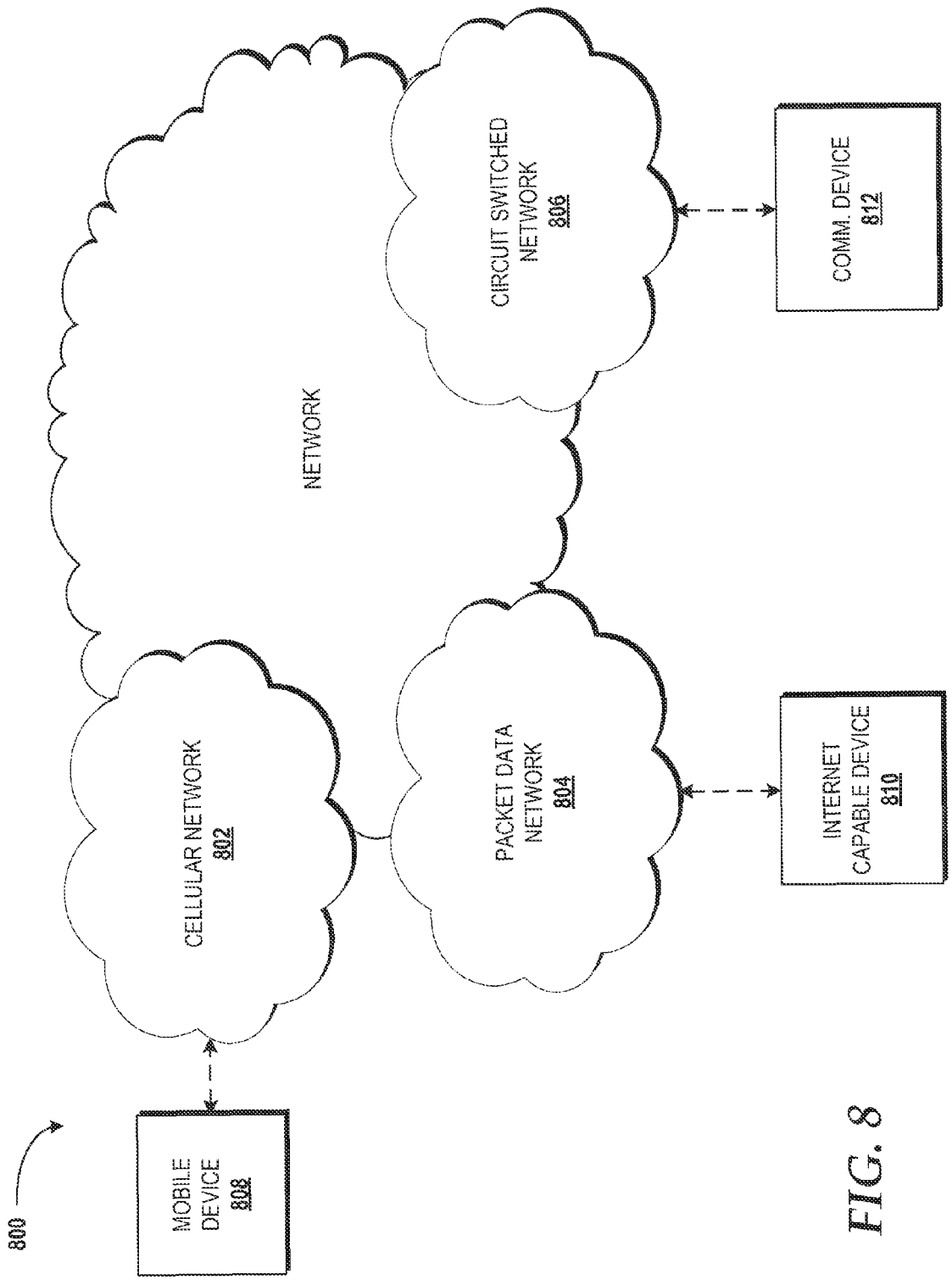
FIG. 8 schematically illustrates a network, according to an illustrative embodiment.

Turning now to FIG. 8, details of a network 800 are illustrated, according to an illustrative embodiment. The network 800 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, the user device 108, the authentication device 106, the conversion device 304, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, the user device 108, the authentication device 106, the conversion device 304, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, the user device 108, the authentication device 106, the conversion device 304, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 800 is used to refer broadly to any combination of the networks 802, 804, 806. It should be appreciated that substantially all of the functionality described with reference to the network 800 can be performed by the cellular network 802, the packet data network 804, and/or the circuit switched network 806, alone or in combination with other networks, network elements, and the like.

Based on the foregoing, it should be appreciated that concepts and technologies directed to spoofing bone conduction signals have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   comparing, by a device, a first unique body signature associated with a first user to a second unique body signature associated with a second user to determine a first unique effect of a first body of the first user on a reference bone conduction signal and a second unique effect of a second body of the second user on the reference bone conduction signal;
   generating, by the device, an authentication signal based upon the first unique effect and the second unique effect, the authentication signal comprising signal characteristics that, after propagating through the first body of the first user, are representative of the second unique body signature; and
   transmitting, by the device, the authentication signal through the first body of the first user to an authentication device that authenticates the first user on behalf of the second user based upon the second unique body signature.

2. The method of claim 1, further comprising obtaining, by the device, the first unique body signature and the second unique body signature from a server.

3. The method of claim 1, further comprising generating, by the device, the first unique body signature and the second unique body signature.

4. The method of claim 1, wherein the authentication device comprises a device to which the first user desires access.

5. The method of claim 1, wherein the authentication device authenticates the first user to access a further device.

6. The method of claim 1, wherein the authentication device authenticates the first user to access an area.

7. The method of claim 1, wherein generating, by the device, the authentication signal comprises:
  receiving a signal from a user device; and
  modifying the signal to generate the authentication signal.

8. The method of claim 1, wherein generating, by the device, the authentication signal comprises:
  receiving a signal from the first body of the first user; and
  modifying the signal to remove the first unique effect and to add the second unique effect, thereby generating the authentication signal.

9. A device comprising:
  a processor; and
  a memory that stores instructions that, when executed by the processor, cause the processor to perform operations comprising:
    comparing a first unique body signature associated with a first user to a second unique body signature associated with a second user to determine a first unique effect of a first body of the first user on a reference bone conduction signal and a second unique effect of a second body of the second user on the reference bone conduction signal,
    generating an authentication signal based upon the first unique effect and the second unique effect, the authentication signal comprising signal characteristics that, after propagating through the first body of the first user, are representative of the second unique body signature, and
    transmitting the authentication signal through the first body of the first user to an authentication device that authenticates the first user on behalf of the second user based upon the second unique body signature.

10. The device of claim 9, wherein the memory further stores instructions that, when executed by the processor, cause the processor to perform operations comprising obtaining the first unique body signature and the second unique body signature from a server.

11. The device of claim 9, wherein the memory further stores instructions that, when executed by the processor, cause the processor to perform operations comprising generating the first unique body signature and the second unique body signature.

12. The device of claim 9, wherein the authentication device comprises a device to which the first user desires access.

13. The device of claim 9, wherein the authentication device authenticates the first user to access a further device.

14. The device of claim 9, wherein the authentication device authenticates the first user to access an area.

15. The device of claim 9, wherein generating the authentication signal comprises:
  receiving a signal from a user device; and
  modifying the signal to generate the authentication signal.

16. The device of claim 9, wherein generating the authentication signal comprises:
  receiving a signal from the first body of the first user; and
  modifying the signal to remove the first unique effect and to add the second unique effect, thereby generating the authentication signal.

17. A computer-readable storage medium having instructions stored thereon that, when executed by a processor of a device, cause the processor to perform operations comprising:
  comparing a first unique body signature associated with a first user to a second unique body signature associated with a second user to determine a first unique effect of a first body of the first user on a reference bone conduction signal and a second unique effect of a second body of the second user on the reference bone conduction signal;
  generating an authentication signal based upon the first unique effect and the second unique effect, the authentication signal comprising signal characteristics that, after propagating through the first body of the first user, are representative of the second unique body signature; and
  transmitting the authentication signal through the first body of the first user to an authentication device that authenticates the first user on behalf of the second user based upon the second unique body signature.

18. The computer-readable storage medium of claim 17, wherein generating the authentication signal comprises:
  receiving a signal from a user device; and
  modifying the signal to generate the authentication signal.

19. The computer-readable storage medium of claim 17, wherein generating the authentication signal comprises:
  receiving a signal from the first body of the first user; and
  modifying the signal to remove the first unique effect and to add the second unique effect, thereby generating the authentication signal.

20. The computer-readable storage medium of claim 17, wherein the operations further comprise generating the first unique body signature and the second unique body signature.

* * * * *